United States Patent [19]

Clarino et al.

[11] Patent Number: 5,341,305
[45] Date of Patent: Aug. 23, 1994

[54] A COMPUTERIZED PATTERN DEVELOPMENT SYSTEM CAPABLE OF DIRECT DESIGNER INPUT

[75] Inventors: Thomas N. Clarino, East Haven; Mary M. Altshul, South Windsor, both of Conn.

[73] Assignee: Gerber Garment Technology, Inc., Tolland, Conn.

[21] Appl. No.: 694,666

[22] Filed: May 2, 1991

[51] Int. Cl.⁵ ............................................. G06F 15/46
[52] U.S. Cl. ................................... 364/470; 364/468; 364/474.24
[58] Field of Search ............... 364/470, 468, 469, 471, 364/474.24; 395/125

[56] References Cited

U.S. PATENT DOCUMENTS

| | | |
|---|---|---|
| 3,391,392 | 7/1968 | Doyle . |
| 3,473,157 | 10/1969 | Little et al. . |
| 3,534,396 | 10/1970 | Hart et al. . |
| 3,596,068 | 7/1971 | Doyle . |
| 3,766,528 | 10/1973 | Ichida . |
| 3,811,113 | 5/1974 | Saito et al. . |
| 3,887,903 | 6/1975 | Martell . |
| 3,895,355 | 7/1975 | Shorrock . |
| 3,924,244 | 12/1975 | Seitz . |
| 4,058,849 | 11/1977 | Fitzgerald et al. . |
| 4,149,246 | 4/1979 | Goldman . |
| 4,451,895 | 5/1984 | Sliwkowski . |
| 4,539,585 | 9/1985 | Spackova et al. . |
| 4,546,434 | 10/1985 | Gioello . |
| 4,552,991 | 11/1985 | Hulls . |
| 4,570,033 | 2/1986 | Hulls . |
| 4,578,376 | 7/1986 | Burton et al. . |
| 4,807,143 | 2/1989 | Matsuura ........................ 364/470 |
| 4,853,715 | 8/1989 | Paschkis . |
| 4,961,149 | 10/1990 | Schneider et al. ................ 364/410 |
| 4,963,703 | 10/1990 | Phillips et al. . |
| 5,089,971 | 2/1992 | Gerber ............................. 364/470 |
| 5,172,326 | 12/1992 | Campbell, Jr. et al. ........... 364/470 |
| 5,175,806 | 12/1992 | Muskovitz et al. .............. 395/125 |

FOREIGN PATENT DOCUMENTS

| | | |
|---|---|---|
| 4013836 | 10/1991 | Fed. Rep. of Germany . |
| 4100534 | 1/1992 | Fed. Rep. of Germany . |
| 85634A/89 | of 0000 | Italy . |
| 1221349 | of 0000 | Italy . |
| 2050658 | of 0000 | United Kingdom . |

OTHER PUBLICATIONS

Lisa Cedrone, CAD/CAM Marches On, pp. 82–86, Bobbin, Jan. 1991.
AccuMark 300 User's Manual, Document No. 05231-003, Issue No. 3, Apr. 1989, Chapter 6, by Gerbar Garment Technology, Inc.

Primary Examiner—Jerry Smith
Assistant Examiner—Jim Trammell
Attorney, Agent, or Firm—McCormick, Paulding & Huber

[57] ABSTRACT

A pattern development system for use during the garment development process includes a digitizer with a work surface. The designer draws the lines of the garment pattern on the work surface with a stylus that enables the digitizer to present position signals to a controller in real time. The controller includes algorithms to compose the drawn lines into a garment pattern as well as compensate for human errors such as multiply drawn lines and missing line portions. The present system is transparent to the designer in operation as it adapts to the human designer rather than forcing the designer to adapt to the system.

26 Claims, 5 Drawing Sheets

A COMPUTERIZED PATTERN DEVELOPMENT SYSTEM CAPABLE OF DIRECT DESIGNER INPUT

TECHNICAL FIELD

The present invention relates generally to systems for use with the design of fabric articles and more particularly to computerized systems for use in the design and creation of garments.

CROSS-REFERENCE TO RELATED APPLICATIONS

Some of the subject matter hereof is disclosed and claimed in the commonly owned U.S. patent applications entitled "A Garment Cutting System Having Computer Assisted Pattern Alignment", Ser. No. 694,871; "Method For Splitting Marker Lines And Related Method For Bite-By-Bite Cutting Of Sheet Material", Ser. No. 694,942, U.S. Pat. No. 5,214,590 each of which is incorporated herein by reference.

BACKGROUND OF THE INVENTION

Computerized systems adaptable for use with the fabrication of clothing are known in the art. Known systems include U.S. Pat. No. 4,546,434. The method disclosed in the '434 patent is for visually composing and editing original apparel designs and includes the steps of providing a plurality of configurations of individual garment components, compiling a computer database from which the components may be retrieved and assembled in a finished apparel format on a figure outline in selected composite fashion, and if desired, modifying the apparel design by replacement of any component by a selection of a new element from the database by the use of an electronic locating instrument. Further, the design may be presented as a permutation of any one or more selected parts. When a design is completed, its component CRT image is made available in accordance with the '434 method as hard copy which can subsequently be used in cutting component parts comprising the design on suitable piece goods.

U.S. Pat. No. 3,596,068 discloses a system for optimizing material utilization. The '068 system automatically arranges patterns on a surface of a material in a manner which will require less material than which would otherwise be consumed by a human performing the same task. The simulated movement of each pattern piece about an established marker boundary is accomplished by data processing techniques. Once the contour of a piece outline and boundary outline is known and the slopes of the vertex connecting the segments are determined, the '068 system displaces the pieces within the boundary in a nonoverlapping manner.

U.S. Pat. No. 4,853,866 discloses a method and apparatus for matching panels to be cut from pattern fabrics. The '866 method and apparatus first defines matching points in each of several patterns of panels to be cut and digitizes the panels at these points so that the coordinates in respected identification codes for each of the points are recorded in memory. Matching relationships are then defined for the matching points which unequivocally fix the position which the design must be in at each of the matching points and records these relationships in memory. Thereafter, separation margins between the panels and distribution are established by the '866 method and apparatus, either automatically or interactively on the basis of the previously defined matching relationships. A vision sensor is then automatically positioned over the spread pattern fabric which is to be cut in the positions of the matching points which have been defined for each one of the panels which have been distributed for cutting. The relative design position with respect to a reference position at each of the matching point positions is then determined and a position correction obtained for each panel with respect to the position initially assigned to each one of the panels to be cut. Each position correction is obtained on the basis of the positions of the pattern determined in the previous step and on the basis of the previously defined matching relationships wherein all of the panels which are to be cut are matched prior to proceeding with their cutting operation.

U.S. Pat. No. 4,149,246 discloses a system for creating custom garments of clothing by combining data on a personal tailoring measurements of the wearer, physical characteristics of the wearer, garment pattern and garment options selected on the basis of resulting combinations of personal pattern data. The '246 system is embodied with a central location unit including a cutting table apparatus, a memory and a pattern processing system. The central units serves a plurality of remote location equipments through a communication system. The remote equipments include an interactive graphic display wherein an operator can customize the garment. A garment pattern is first selected from memory. Personal physical data is supplied and the two forms of data are combined to provide a representative of the combination. Upon confirmation, the specific pattern data is processed to control a central location cutting table apparatus to provide the components which are sewn together to create the desired garment.

U.S. Pat. No. 4,058,849 discloses a system for converting a rough sketch into a finished drawing. In the '849 system, an electronic digitizing tablet or its equivalent is used to receive a roughly sketched object by an operator along with the desired final proportions which are entered into a stored table called a pointing sequence list (PSL) capable of storing all of the information required to define both the original form and the desired final configuration of the object. The PSL initially contains positional entries representing the coordinates of definitive points on the roughly sketched object and dimensional entries specifying the proportions which the object is to have in its final configuration. These are arranged in an order corresponding to a predefined pointing sequence which is followed by the operator when he enters the necessary items into the graphic information system. The PSL is subsequently converted to a new PSL by a rectifying procedure which modifies the coordinates of the previously entered points when necessary in order to effect the horizontal and vertical alignments of points ostensibly located on common, axially directed lines. Consequently, the '849 system is limited to rectifying a rough sketch into a preferred final geometry to eliminate undesirable irregularities from, for example, nonparallel lines.

In addition, the prior art includes systems for manipulating databases which have digital images of articles, such as garment segments, (equivalently; pieces, panels or patterns). However, the prior art is directed towards the creation and manipulation of computer databases after the garment segments have been put in their final form for that garment piece by the designer or pattern maker. The known systems are all characterized by computer software which requires closed polygonal elements in order to be manipulated, such as for grading or other purposes. Further, the natural intuitive actions of the designer during the development process, such as erasures, redrawn lines, etc., are not compatible with the known computerized systems.

It would be advantageous to have a system which to be used to during the creative pattern developing process itself that digitizes an article's elements in real time and constructs the garment segments in a final form. This system would be capable of use during the development process in which the garment segments have no preselected final geometric shape. The present invention is drawn towards such a system.

SUMMARY OF INVENTION

An object of the present invention is to provide a pattern development system for use during the garment design and pattern making processes capable of creating a database of signals corresponding to drawn garment segment patterns.

Another object of the present invention is to provide a pattern development system of the foregoing type capable of real time generation of position signals for the database as a garment segment pattern is being drawn.

Still another object of the present invention is to provide a pattern development system of the foregoing type that composes digitized signals representing drawn pattern lines into pattern signal groups corresponding to drawn garment segments.

Another object of the present invention is to provide a pattern development system of the foregoing type that edits said pattern signal groups by deletion or addition of position signals to provide a complete pattern, free of extraneous position signals.

According to the present invention, a system for use in developing a garment pattern comprised of a plurality of garment pattern segments includes a stylus for drawing a visible line on a sheet of work material and further having an enabling mechanism for selectively enabling the generation of position signals in an electrical circuit in proximity with a stylus tip. A digitizer having a digitizing panel in substantial registration with a work supporting surface is adapted to receive the work material sheet. The digitizing panel has an electrical circuit for producing position signals representing the position of the stylus tip relative to the supporting surface as the stylus is moved over the work supporting surface in proximity thereto. A controller is adapted to receive the position signals and to generate a database of signals corresponding to at least one garment pattern segment. The controller includes a composing mechanism for composing pattern segment lines from a set of adjacent position signals and further forming garment pattern segment signal groups from selected ones of said pattern segment lines corresponding to said garment pattern segment. An editor is provided for editing selected position signals in said segment lines in response to instruction signals. A memory stores the signal database. Also, a graphic display device connected with the controller visually displays selected ones of the position signals as well as the instruction signals and signals indicative of the operational status of the system. An input mechanism provides for the manual input of the instruction signals to the controller.

DESCRIPTION OF THE PREFERRED EMBODIMENT

A pattern maker or designer of a garment begins the development process by drafting a garment pattern from (1) scratch, (2) a first pattern, (3) a production pattern from a previous style, (4) a pattern from an existing garment or (5) by working from fabric which has been draped on a dress form or fit model. Each garment pattern is comprised of a plurality of garment pattern segments or pieces.

Figure 1:
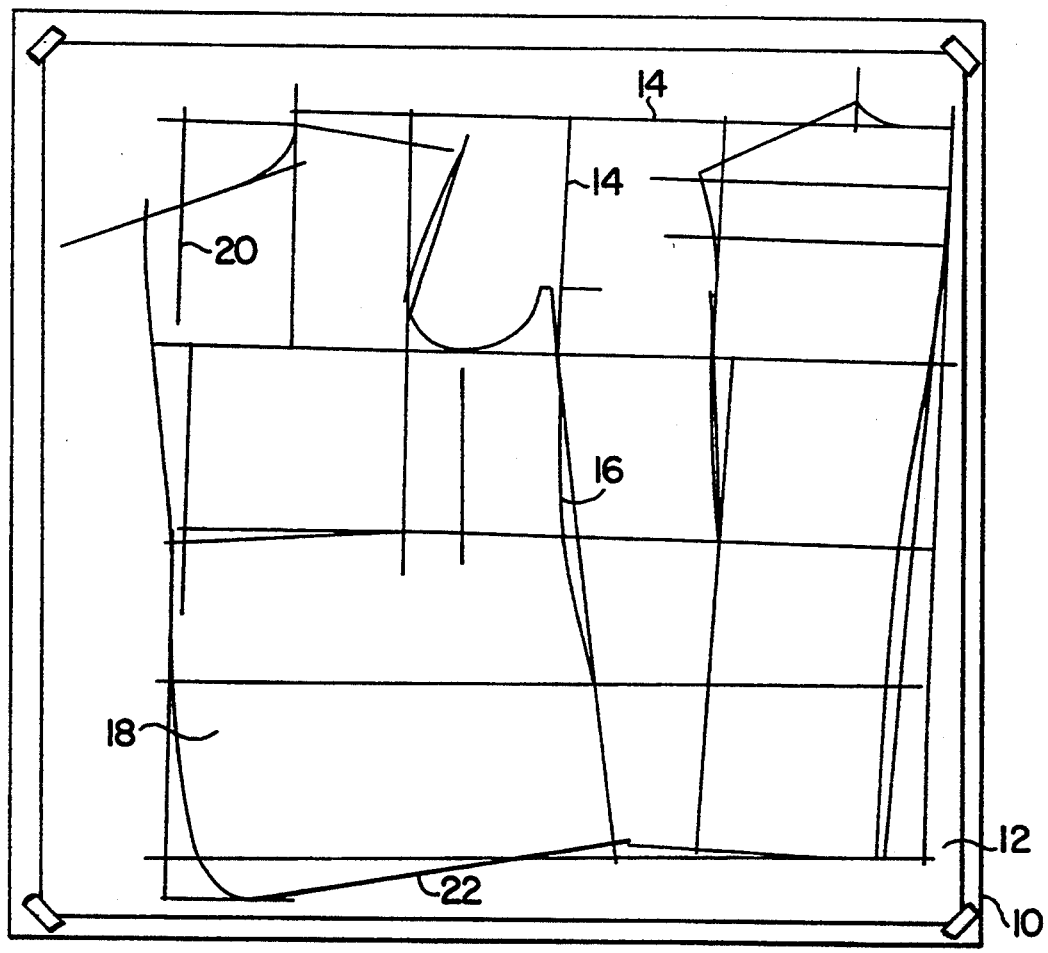
FIG. 1 is a plan view of a drawing having key body landmarks and sketches of garment piece patterns.

Referring now to FIG. 1, there is shown a drafting table 10 on which is a large sheet of paper 12. When drafting a pattern from scratch, the pattern maker begins with the blank piece of paper. Initial guidelines 14 representing key body landmarks are drawn in pencil on the paper with the aid of straight edges (rulers). Lines 16 representing the garment piece 18 (garment pattern segment) are then created off of the guidelines using rulers, curve templates or by drawing curves freehand. Initial changes are made by the pattern maker by simply erasing unwanted lines such as line 20. Also, the pattern maker may wish to darken an ink line of the garment piece as an aid during the development process. This is typically done by retracing one or more of the lines 22 in the garment piece.

Figure 2:
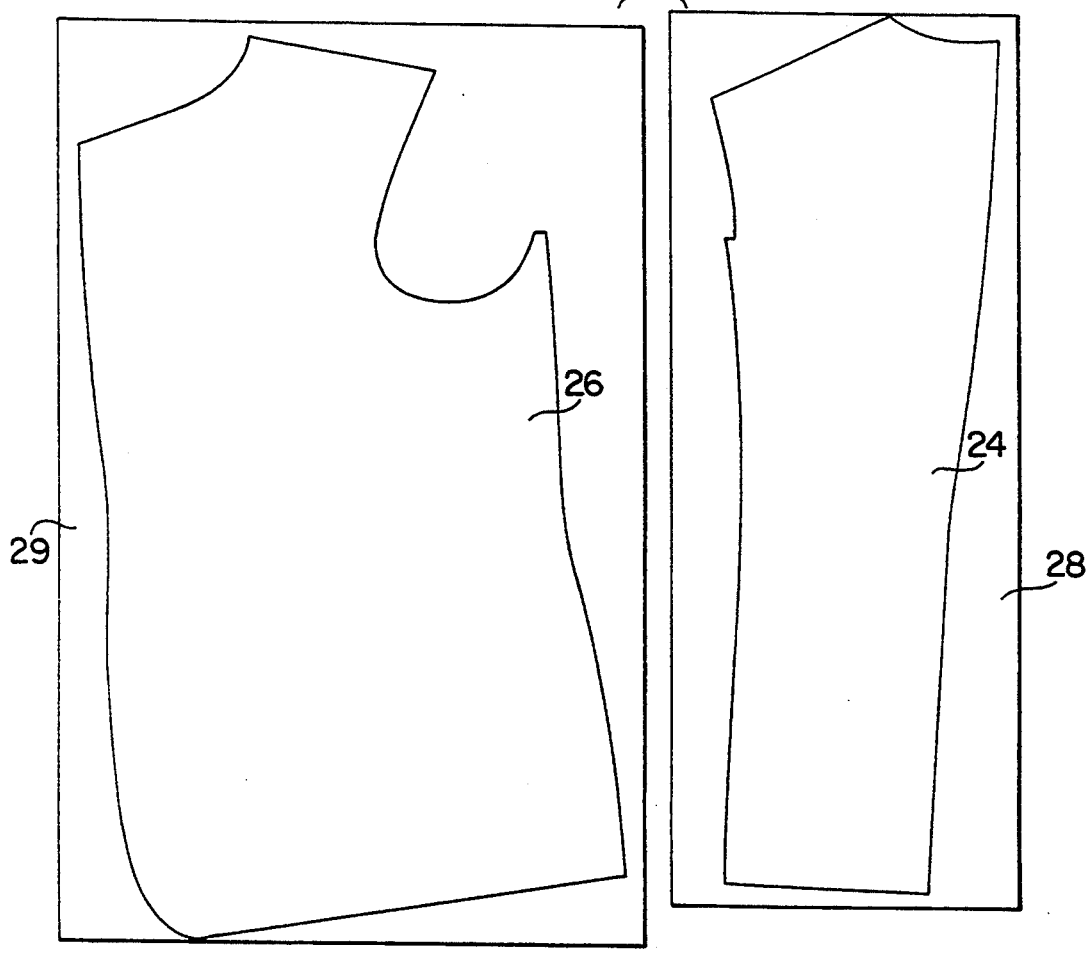
FIG. 2 is a plan view of a drawing from which garment piece patterns are lifted.

When working from a first garment pattern segment which is created to capture the intent of the designer, changes must be made which make that style of garment production ready. As shown in FIG. 2, each piece is separately lifted off in the prior art by tracing and cutting the individual garment pattern segments 24, 26 from a separate sheet (or sheets) of paper 28, 29.

Manufacturing standards must be then integrated into the pattern pieces 24, 26. Therefore, the patterns must be again altered. Typical changes include checking for curve shapes, angles, generation of facing/secondary pieces, standard seam allowance treatments, measurement checks (both across pieces and perimeter lines), and necessary markings for notions. The pattern maker will first examine the existing pieces for the style to determine the changes which need to be made. The pattern segments are taped to the pattern makers table and again traced onto a clean piece of paper that is laid over the original. The subsequent tracing is subsequently altered to reflect the desired changes. Markings can also be transferred using a known tracing wheel. Adjustments are then made according to the pattern maker's judgement.

Figure 3:
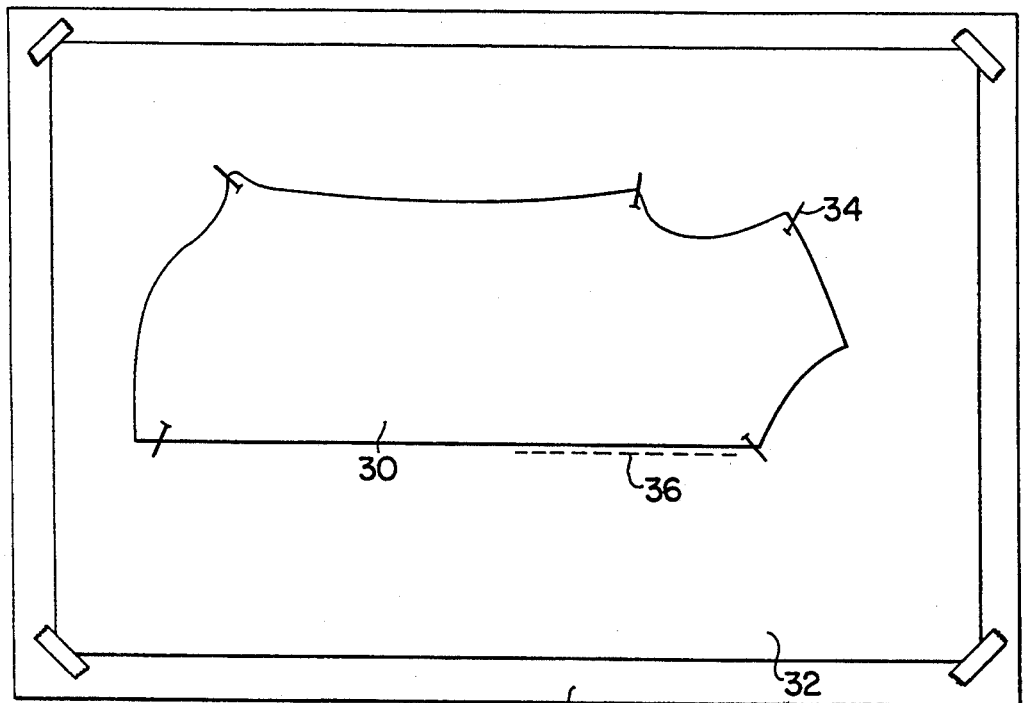
FIG. 3 is a plan view of a drawing board having garment piece patterns affixed thereto.

It is common to use the patterns of styles from previous seasons which are similar to the intended design. In this way fewer changes are necessary and less time is needed to create the new patterns. In a manual production environment such piece patterns 30 are in a hard paper (manila) or plastic form. As demonstrated in FIG. 3, the pattern maker tapes or pins a blank piece of paper 32 to the table 33 and places the hard pattern on top. The pattern can be traced by simply running the pencil/pen against the edge of the pattern. Internal markings can be obtained by sticking a push pin 34 through the manila pattern along the internal markings. A line (dashed line 36) is then created on the traced pattern by connecting the pin pricks on the tracing paper using rulers and/or curves. Internal markings can also be transferred to the tracing paper by placing the manila pattern underneath the tracing paper and the internal markings are traced off of that.

Patterns can also be taken from existing garments in the prior art by disassembling the garment into cloth pieces, placing the cloth piece onto the table and then transferring the cloth piece shape to paper by typical methods such as tracing or using a pattern wheel. Designing can be done directly on a dress form or fit model by draping the fabric thereon. The fabric can be pinned in place, drawn on and cut or clipped with scissors. The result can be used as a guide to create a paper pattern. The fabric is laid flat on the table and the shape and markings are transferred to paper in the manner described above.

Multiple pieces or garment segments are required to make a single garment. It is often necessary to create certain curves (areas) by reworking common areas on corresponding pieces with multiple iterations where the requirements of the geometry on the paired pieces is dependent on the remaining pieces of the garment. This must be done on the paper patterns.

Figure 4:
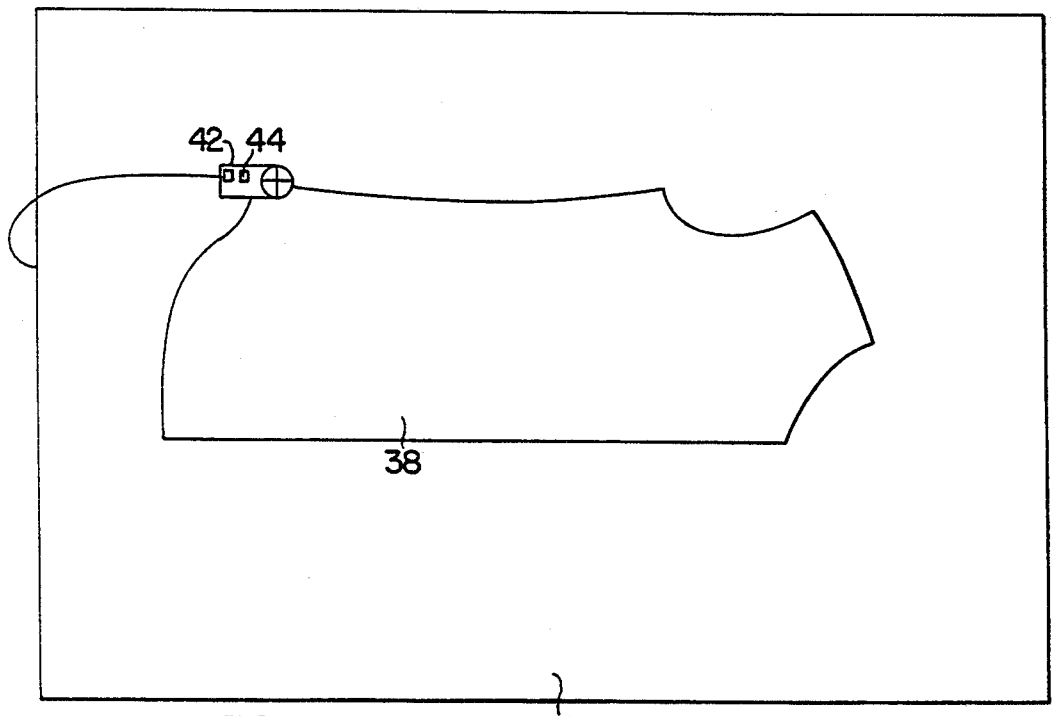
FIG. 4 is a simplified illustration of a digitizing tablet used with a prior art digitizing system.

Once the development process is finished, the garment piece patterns can be digitized by known systems, such as the Accumark system marketed by Gerber Garment Technology (GGT), the assignee of the present invention. As seen in FIG. 4, with the Accumark system a predrawn and/or cut garment piece pattern 38 is taped or pinned onto a digitizing tablet 40. Digitizing puck 42 is manually moved about the tablet along the perimeter of the pattern. Selected points therealong are picked off by activation of appropriate switches 44 on the puck. The Accumark system is configured to create a digital image of the predesigned garment piece pattern and store that image in a garment piece pattern database along with other images of garment piece patterns for similar pieces, such as sleeves. These stored images can be manipulated by a computer to compose a garment of selected images as well as grade these images for different sizes.

While the adoption of computer based systems in the development process in many areas such as architecture or engineering has proceeded quickly, the same cannot be said for the clothing industry. At present, there remains a strict bifurcation of the process of making garments into the "creative", initial phases accomplished without computerization and the subsequent ones that adapt designs for mass production in which computers are used routinely.

The great resistance to computerization by designers lies with the failure of known systems to adapt to the human development design process. Instead, designers were expected to adapt to the computer systems and design clothes on, for example, video display terminals. It has not been appreciated by the prior art that garment design relies on human perception of subtleties such as texture and proportion in three dimensions, all of which are lost in a computer graphics display.

Figure 5:
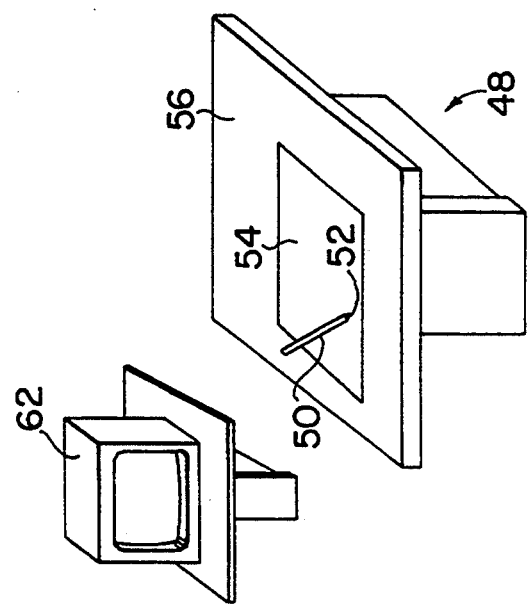
FIG. 5 is a simplified schematic illustration of a pattern development system provided according to the present invention.

In contrast, the present invention solves the problems of the prior art by adapting the computer system to the existing development process and endeavors to be as transparent to the designer as possible. Referring now to FIG. 5, there is schematically shown a pattern development system 46 provided according to the present invention. The system 46 can be used as a stand alone unit or as a supplement to an existing garment piece database manipulation system. The system 46 comprises a large drafting table 48 which is also configured to be a digitizer. The size of the table 48 is selected in accordance with the wishes of the designer, but is typically large enough to accommodate garment piece patterns or the garments themselves (e.g. input surface 66"×48", 44"×36" through 12"×12"). The drafting table/digitizer can be of the type sold by the Numonics Corp. of Montgomeryville, Pa. and may have a backlight, if desired. A stylus 50 is included and is characterized by a point 52 which will write in ink or pencil on a paper sheet 54 placed on a top surface 56 of the table. The stylus is preferably of the cordless and graphite type, and further comprises a manually selectable switch which enables signals to be presented to receiving elements in the table in a known manner to digitize the position of the stylus as it is moved about the top work surface.

The present system further comprises a controller 58 programmed in accordance with algorithms detailed hereinafter to convert the lines drawn into piece patterns for subsequent manipulation in a garment database such as is done with the aforementioned GGT Accumark system. The controller preferably comprises a 80386/486 type 32 bit processor, a 32 bit mathematics coprocessor, 4 Mbytes of internal memory and 40 Mbytes of storage. A 1.2 Mbyte diskette is provided as well, as is other conventional components need to configure the controller to operate with a MS-DOS operating system such as a keyboard and printer. Also included is a monochromatic system management workstation 60 and a color design and marking workstation 62 used during the development process. The present system will support the operation of a plotter or cutter 64 as well. The table and stylus receiver unit (not shown) plug into a "mouse" port on the controller for receiving data in serial format.

The development process provided by the present invention can begin in a number of ways, such as by taping or pinning paper patterns or fabric to the design surface. Fresh paper is then overlaid and taped or pinned on the pieces. When drafting from scratch, only clean paper is placed on the design surface. The initial pattern is then traced onto the clean paper using the systems pen/pencil-stylus. As the lines are traced using rulers and curves, the stylus transfers the markings to the paper and computer screen simultaneously. To trace the pattern lines, the pattern maker as user can trace the lines in multiple subsegments adjusting and switching tools, in nonconsecutive order and in different directions. All in contrast to known systems which require consecutive movement in a single direction.

Figure 6:
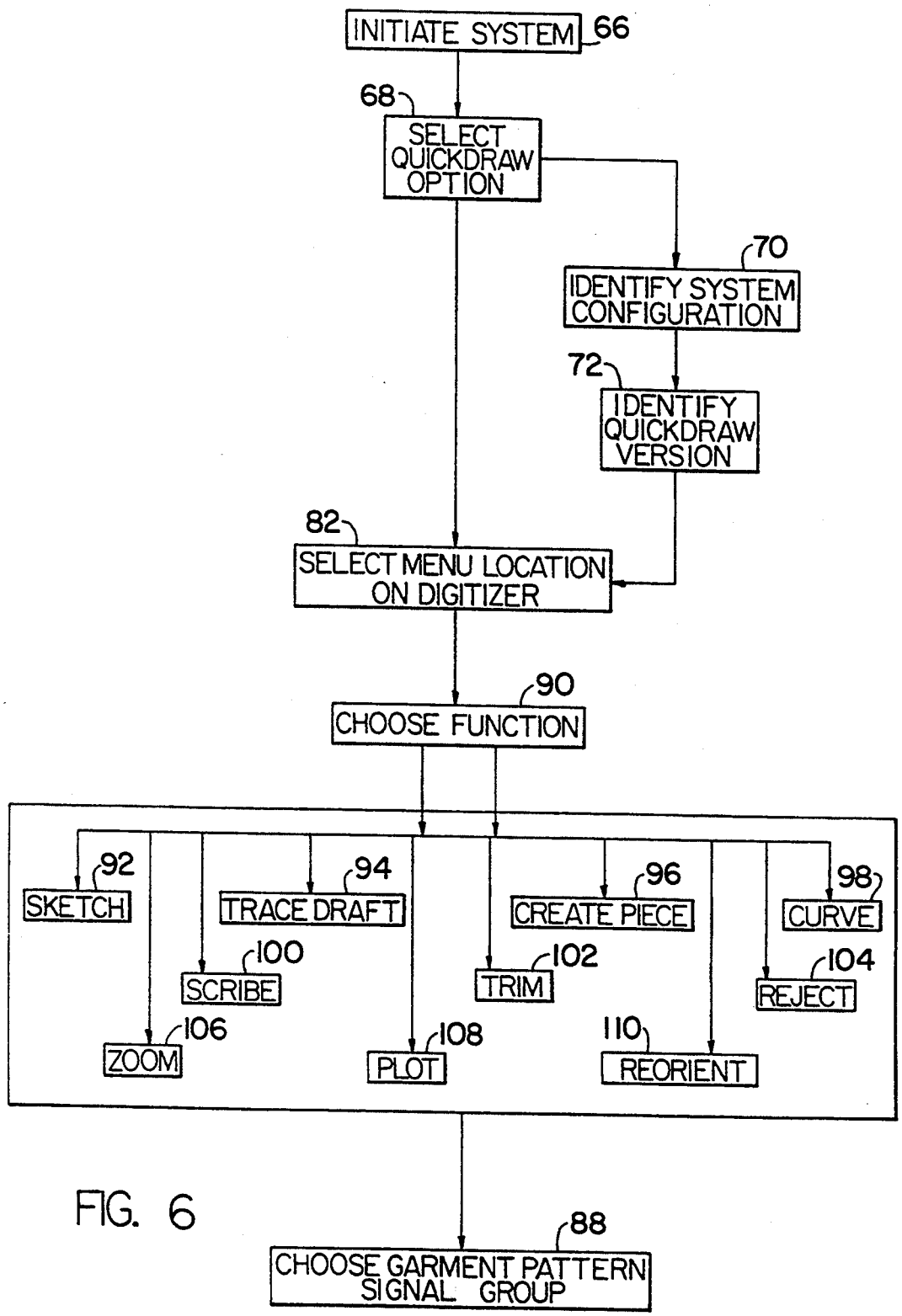
FIG. 6 is a diagram showing an algorithm executed by the controller of FIG. 5.

As illustrated in FIG. 6, the present system is first initialized at block 66. When configured with an Accumark system, the present pattern development system is executed from the AccuShell main operating program menu by executing the "Silhouette" labeled option (block 68). The submenu options of "Silhoutte" include RUN SILHOUTTE, RUN SYSTEM MANAGMENT and RETURN TO MAIN MENU. Selecting RUN SILHOUETTE will initiate the program, displaying the "color-scope-idle" screen which has SILHOUETTE in place of the MED and PDS algorithm options that are otherwise found with the Accumark system. Selecting RETURN TO MAIN MENU returns the user to the ACCUSHELL main menu. Selecting exit from within Accumark digiting program "pattern development system" (PDS) returns the user to the AccuShell. Selecting RUN SYSTEM MANAGEMENT executes the System Management algorithm from which the user can access the standard data management processes such as reports, editors, piece verify and order. Selecting SHUTDOWN returns the user to the SYSTEM MANAGEMENT submenu, and selecting EXIT from the submenu returns the user to the ACCUSHELL main menu.

When the present invention is first installed or configured, additional questions to the user are posed at the initiation of the SILHOUETTE algorithm, including those designed to determine the hardware configuration of the system (block 70) and the version of the algorithm (block 72). After the system asks, "IS THIS A PLOTTER WORKSTATION?", the system will prompt "IS THIS A SILHOUETTE WORKSTATION?". If the user answers in the negative, the algorithm continues without asking the questions relevant to SILHOUETTE. If the user answers yes, the following questions are asked with the corresponding options indicated:

---

WHICH CONFIGURATION OF SILHOUETTE DO YOU HAVE?
1. SILHOUTTE ADD ON TO STANDARD ACCUMARK
2. SINGLE SCOPE SILHOUTTE STATION
WHICH SIZE INPUT TABLE DO YOU HAVE?
1. 60" × 44"
2. 40" × 36"

---

As noted above, the present invention as set forth in the SILHOUETTE embodiment can be added to existing Accumark systems or integrated into a single system. The input table refers to the digitizer with the planar work surface. The present invention also includes an option for a stand up plotter that is added to a plotter configuration prompt presented to the user at this time.

Figure 7:
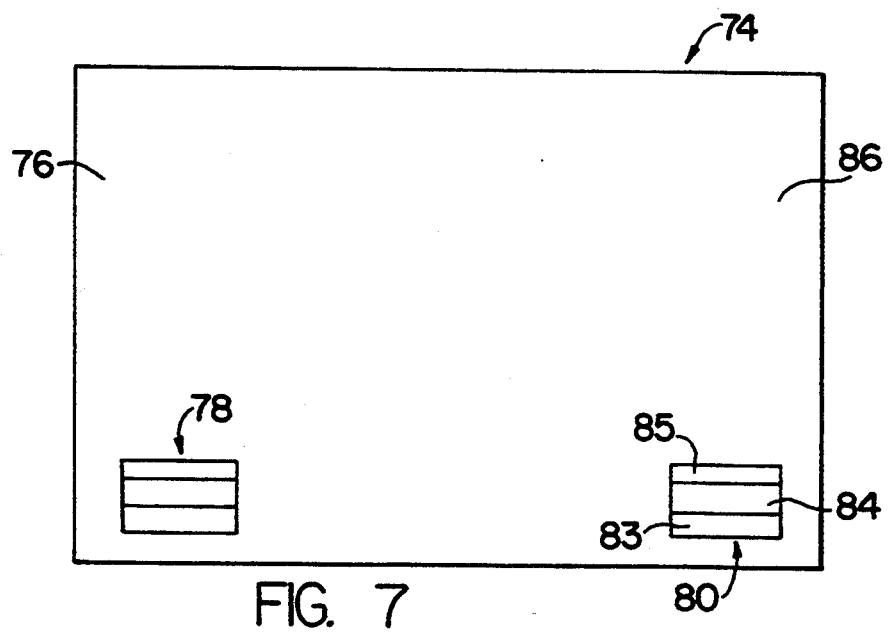
FIG. 7 is a schematic illustration of a digitizer used with the system of FIG. 5.

Except for a small section of the tablet, the entire input surface of the table is mapped to the entire work area of the PDS screen in a full-scale mode. In FIG. 7 there is shown a tabular digitizer 74 having a work surface 76. Subportions 78 and 80 correspond to those portions of the work surface which are not directly mapped into the garment pattern segment database as detailed hereinafter. These subportions are configured to enable the user to select program options with the stylus directly without the use of a keyboard or mouse. The command MENU LOCATION allows the user to position this area in either the bottom left or bottom right subportions of the surface. The default setting is for the right side. Selecting this option will toggle the menu position. The following is presented to the user: MENU SELECTION AREA IS LOCATED ON THE RIGHT (LEFT) SIDE OF THE TABLE, PRESS STYLUS BARREL SWITCH TO CONTINUE. See block 82, FIG. 6. Note that the present system is configured to be used with a "stylus" of a known type having a depressable barrel switch therein.

As seen in FIG. 7, the subportions 78, 80 comprise three areas 83, 84 and 85. Lower area 83 is used to input commands from the surface and contains menu options. A list of the different garment pieces is found in area 85. The relative size of the areas 83 and 85 are exaggerated for illustrative purposes. In order to decrease user arm movement while selecting from the menu area or the icon menu and to allow the user to work in a reduced input area, area 84, 6"×6" in dimension is also mapped to the entire work area of the screen. When the user has not selected a command function and moves the stylus from the primary input area 86 of the work surface to the section 78 or 80, the algorithm alters the scale of movement of the cursor on the display. If, however, the user is in a command function mode and moves the stylus in the area 83, there is no effect on the system, and the user can operate the system within that area without the digitized input signals changing scale.

Lines can be created in several different ways while designing with the present invention. Curves can be created by the user depressing the stylus tip and dragging the stylus as the curve is being drawn. A curve template or straight edge can be employed or the lines drawn freehand. While tracing an existing pattern, all of the straight line segments can be created first using a straight edge or ruler, and then drawing all of the curve lines. An alternate approach would be to work in one area of a garment pattern segment until it is completed for that particular iteration. Regardless of the technique, the present invention digitizes the pattern lines to comprise a sequence of position signals presented directly to the controller.

The user must select which function is to be implemented by the system (block 90). Before the lines are sketched, the user selects the garment pattern signal group for a garment pattern to which the new pattern lines will belong (block 88). The function choices are sketch (block 92), trace draft (block 94), create piece (block 96) curve/line (block 98), scribe (block 100), trim (block 102), reject (block 104), draft scale and draft zoom (block 106), plot (block 108) and reorient (block 110). The operation of the various functions are detailed hereinafter.

In response to the prompt SKETCH FUNCTION, SELECT BLOCK (GROUP) TO SKETCH LINE(S) the user begins drawing lines. As the lines are drawn on the paper they appear on the display screen. PRESS STYLUS TIP AND DRAW TO SKETCH LINES. If this function is used to create only perimeter lines of a garment pattern, then DRAFT/CREATE PIECE is used to create a garment pattern segment for the PDS function in the Accumark system. If this function is used to draft a piece, or trace internals as well as perimeters, then DRAFT/TRACE DRAFT function is used to create a PDS piece. The controller automatically assembles the position signals into the various segment lines and identifies them as associated with a particular signal group.

When the position signals that correspond to the pattern lines are compiled into the selected block or group, the present system is configured to automatically correct and compensate for the variations in the perimeter caused by subsequent traces of the pen. Therefore, when a designer "darkens" a pattern line by multiple passes of the pen, the present system disregards subsequently generated position signals if they are identical to the previously generated ones and computes an "average" pattern line for those that are displaced laterally from the initially drawn pattern line. In this regard, the present system determines a position of the desired pattern line based on an average position of the separately drawn sublines.

Further, the present system determines which position signals are extraneous in that they are located beyond the perimeter of the garment pattern. In those situations where the drawn lines are incomplete because, for example, the designer failed to move the stylus fully about the perimeter, the present system determines an appropriate intersection with an adjacent pattern line and generates the corresponding position signals to complete the garment pattern segment signal group. The ability of the present system to work with the pattern lines as drawn when compiling a garment pattern segment signal group marks an important point of departure of the present invention over the prior art.

The function CURVE is used to enter curved pattern lines by entering points along the curve in the manner of digitizing rather than sketching the lines. This feature is also possible for straight lines too, like digitizing. The system then creates a curved line of position points in the database which encompasses the entered points.

Initially, the user selects the signal group desired in response to the prompt Step 2 SELECT BLOCK TO CREATE CURVE. Next, the user selects the signal points in the curve in response to Step 2 SELECT POINTS ALONG CURVE, DEPRESS BARREL SWITCH FOR STRAIGHT LINES. Beginning at one end of the curve, points are created by depressing the stylus tip at intervals along the curve. As the points are placed they are displayed on the screen. Signal points can be deleted in the same way as in the LINES/DIGITIZE LINE function.

The CREATE PIECE function creates an acceptable AccuMark piece (garment pattern signal group as designated in the present application), a closed figure with lines received in order in the clockwise direction. This function is only used for sketched pieces which have no internal structure. Those garment patterns that have such internal structure have to be created after the perimeter is closed unless TRACE DRAFT is used in the drawing process. Initially, the system provides the prompt: SELECT BLOCK(S) TO CREATE, DEPRESS BARREL SWITCH TO END. The user selects the block(s) representing the garment pattern to create and then illustrates the position signals on the display in red. After the barrel switch button is depressed, the garment pattern signal group is created and displayed with stripe line and symbols. The default orientation is horizontal.

The TRACE DRAFT function is used to define the perimeter lines of a garment pattern segments, the internal lines of a draft are then selected. With the command SELECT PERIMETER LINES, DEPRESS BARREL SWITCH TO END, the pattern lines are selected in order in a clockwise direction. As the pattern lines that correspond to the perimeter of the garment segment pattern are selected they are displayed in red. Pattern lines can be selected as in the standard CREATE TRACE function. The internal lines are selected and display in red in response to the prompt SELECT INTERNAL LINES, DEPRESS BARREL SWITCH TO END. SELECT GRAIN LINES, DEPRESS BARREL SWITCH TO END is the prompt for selecting the lines to be kept as grain lines. The first one selected is labeled as the primary grain line, GO, and the others are labeled and numbered in order of selection. Depressing the barrel switch button without selecting a line when replying to this prompt causes a horizontal grain line to be generated automatically.

The RESKETCH function is used to enter lines into the perimeter of a "legal" or system compatible piece, to replace existing lines. SELECT LINE(S) TO REPLACE is the command used with this function. The selected lines are shown on the display in red. In response to the PRESS STYLUS TIP AND DRAW TO SKETCH LINES, DEPRESS BARREL SWITCH TO END prompt, the user draws the new lines which display as they are created. After the barrel switch is depressed the new pattern lines are entered into the piece perimeter and the original lines are replaced.

If, after the pattern segments are sketched, the lines extend too far past or do not meet at an intersection, the system may not be able to find the proper intersection created by two adjacent lines. Therefore, after a pattern segment has been sketched and the function CREATE PIECE is used unsuccessfully as indicated by the comment "LINE ORDER FAILURE" the intersect function is used to trim the intersections of two lines. With the intersect function, the user selects a point and moves it along the direction of the line which it is on in reply to SELECT POINT TO REPOSITION, DEPRESS BARREL SWITCH TO END. The points are then placed close to the proper intersection.

The REJECT function is used to reject lines created during the SKETCH function. While in the SKETCH function the user can select the REJECT which deletes the last line created. No prompt is given.

The REORIENT function is used to orient the pattern segment displayed on the screen to the orientation of the piece on the table. This function lets the user pick up the paper or fabric pattern and reposition it on the table while working and have the garment pattern on the screen display in the same orientation so that sketched lines can continue to be input. This function can be used to enter large pattern segments by first sketching in a portion, repositioning the pattern segment on the table, using REORIENT and then sketching in the remainder.

To use the REORIENT function, the user selects two points on the piece displayed on the screen to be re-displayed in a new orientation when presented with the prompt SELECT TWO POINTS ON PIECE DISPLAYED ON SCREEN. In response to SELECT CORRESPONDING POINTS ON PIECE ON TABLE, the corresponding points are selected on the paper pattern on the table by depressing the stylus tip. The garment segment displayed on the screen is then redrawn to reflect the correct orientation. The system will perceive an error should two sets of points not same distance apart. The user must then re-input the selected points.

Completed garment pattern segments which are newly created and not stored in the AccuMark Database can be plotted on a standup plotter directly from PDS. The garment pattern segment perimeter and internal structural lines are plotted with solid and dashed lines. The user sends the data to the plotter (e.g., Ioline or Numonics brand plotter). The plot is entered into the plotter queue and then sent to the plotter. A single plotter can be used between two systems by means of a switch. The system will typically check to see if the plotter is connected, but not in all configurations. It is desirable that the plotter have a small footprint but simultaneously be able to accommodate large drawings. In this regard, "roller" type plotters are preferable to flatbed ones.

Garment pattern segments which are not stored in the AccuMark Database can be scribed or cut on the plotter using the scribe option. Both the perimeter and selected internals can be scribed. When internals are scribed 1/16" is left on the end of the line indicated by the user. The garment pattern segment is entered into the plotter queue before presentation to the plotter. The plotter uses the blade option rather than the pen to scribe the piece. SELECT BLOCK TO SCRIBE initiates the function. The user selects the block or garment pattern signal group, and the system prompts SELECT INTERNALS TO SCRIBE, DEPRESS BARREL SWITCH TO END.

The user selects the internal pattern line (internals) to be scribed. The blade is moved as with a pen, scribing through the chosen media on the plotter. In some configurations the system will program the plotter to lift the blade in tab regions spaced about the garment pattern segment and score the medium on the tabs, thereby ensuring the garment pattern will remain attached until the user desires it removed. Therefore within the present application "plot" includes any activity that can be accomplished by a plotter, including drawing, scribing and cutting. Thereafter, the piece is sent to the plotter queue for plotting as above.

With the present invention it has been determined that known plotters will sometimes jam when scribing garment patterns as set forth above. Consequently, the present system scribes only when the medium is being pulled through the plotter past the blade. Furthermore, in some applications it is desirable not to completely lift the blade from the medium in the tab regions. Rather, the pressure applied to the blade is simply reduced to a value which is less than needed to cut the medium. This preferred embodiment also produces a garment pattern that is more neatly torn from the surrounding medium.

When working on the work surface and viewing the garment pattern segments on the screen there are several scales which can be utilized. Two scales are available for cursor control. The first is an input mode where an inch on the pattern table surface is equal to an inch on the PDS screen. This is the mode a pattern maker would work in when entering patterns or drafting. The other mode is for standard PDS use where a small area of the table surface as described hereinabove with respect to the MENU section is mapped to the screen. This allows for minimum user arm movement when moving the cursor. While the system is in this mode the user has the option to access a different scale.

Multiple scales are available for displaying garment patterns on the display. The scale initially provided at start up maps the work surface to the screen (X"×Y"). Specific areas of the display can be reconfigured in ZOOM mode so that a garment pattern or segments thereof are magnified, with one inch of the pattern surface still equal to one inch scaled on the screen. Other variations are also available with the present system, and at any time the user can return to a different or previous view or mode by command signal input.

Similarly, although the invention has been shown and described with respect to a preferred embodiment thereof, it should be understood by those skilled in the art that various other changes, omissions and additions thereto may be made therein without departing from the spirit and scope of the present invention.

We claim:

1. A system for use in developing a garment pattern that includes a plurality of preferred garment pattern segment lines positioned in a spatial sequence with consecutive ones of said pattern segment lines having an intersection corresponding to the ends thereof, said system comprising:
   a stylus having a means for drawing a visible line on a sheet of work material and further having an enabling means for selectively enabling the generation of position signals in an electrical circuit in proximity with a stylus tip;
   a digitizer having a digitizing panel in substantial registration with a work supporting surface adapted to receive said work material sheet, said digitizing panel having an electrical circuit for producing position signals representing the position of said stylus tip relative to said supporting surface as said stylus is moved over said work supporting surface in proximity thereto, said stylus tip position signals arranged in signal sets corresponding to randomly drawn, non-continuous or overlapping ones of said drawn lines;
   a controller adapted to receive said positions signals and generate therefrom a database of signals corresponding to said garment pattern segment lines, said controller including:
   a composing means for composing, for each of said pattern segment lines, a preferred pattern segment line signal set from one or more substantially adjacent drawn line signal sets;
   a means for forming a garment pattern signal group corresponding to said garment pattern from selected ones of said pattern segment line signal sets;
   an editing means for editing selected position signals in said segment lines signal sets in response to instruction signals; and
   a memory means for storing said signal database;
   a graphic display device connected with said controller for visually displaying selected ones of said position signals as well as said instruction signals and signals indicative of the operational status of the system; and
   an input means for the manual input of said instruction signals to said controller.

2. The system according to claim 1 further characterized by said digitizer having a backlighted work supporting surface.

3. The system according to claim 1 wherein said controller is further characterized by a means for compiling ones of said drawn lines substantially in registration with one another into a final pattern segment line whose position on said work supporting surface is an average of the position of said compiled drawn lines.

4. The system according to claim 3 wherein said controller composing means forms said preferred garment pattern segment signal sets from those of said final segment lines located substantially adjacent to distal ends thereof to form a perimeter of a closed geometric figure.

5. The system of claim 1 wherein said controller composing means selects adjacent ones of said drawn line signal sets located substantially adjacent to distal ends thereof to form a perimeter of a closed geometric figure as said garment pattern segment signal group.

6. The system of claim 5 wherein said controller composing means forms said preferred garment segment pattern signal sets from adjacent ones of said pattern lines located substantially adjacent to distal ends thereof and eliminates those position signals in said drawn lines extending outward from said closed geometric figure perimeter.

7. The system of claim 5 wherein said controller composing means forms said garment pattern segment signal sets from adjacent ones of said drawn lines located substantially adjacent to distal ends thereof and supplements said drawn lines with position signals approximately corresponding to those position signals necessary to generate said closed geometric figure perimeter.

8. The system of claim 1 wherein said controller composing means further eliminates from a drawn line redundant position signals input to the controller subsequent to a first set of adjacent position signals comprising said segment line.

9. The system of claim 1 wherein, subsequent to the formation of a garment pattern segment signal sets corresponding to a garment pattern segment, said editing means further identifies an image of said garment pattern segment positioned on said work surface at a new orientation in accordance with pattern orientation signals generated by means of said stylus being brought into proximity with selected portions of said garment pattern segment perimeter on said work surface.

10. The system of claim 9 wherein, subsequent to said garment pattern segment identification, said editing means further presents signals to said graphic display device corresponding to a video image of said garment pattern segment configured to approximate the new orientation thereof on said work surface.

11. The system of claim 1 wherein said composing means further for generating a plurality of said garment pattern segment signal sets drawn on a sheet on said work surface from corresponding subsets of said pattern lines.

12. The system of claim 1 wherein said stylus enabling means comprises a finger operated switch.

13. The system of claim 1 wherein said stylus tip comprises an ink cartridge.

14. The system of claim 1 further comprising a plotter means for receiving output signals from said controller indicative of a selected one of said garment pattern segment signal sets and for generating a plot thereof on a selected plot medium.

15. The system of claim 14 wherein said plotter further comprises a cutting blade and wherein said controller further comprises a means for generating blade control signals for altering blade pressure applied to said media during said plot generation.

16. The system of claim 15 wherein said blade control signal generation means further generates signals to adjust said blade pressure to only scribe said media in tab regions of said garment pattern segment.

17. The system of claim 15 wherein said blade control signal generation means further generates signals to adjust said blade pressure to only cut in a signal direction as said blade and said media are moved relative to one another.

18. A system according to claim 1 further characterized by said manual input means including means in said controller causing a portion of said display screen to be devoted to the display of an instruction menu consisting of a plurality of instructions each located in a separate area of the screen and for causing a portion of said digitizer in registration with said work supporting surface to be related to the menu display by said display screen whereby a desired instruction provided by said menu may be input to said computer by touching said stylus to the area of said work support surface associated with said instruction.

19. A process for developing garment patterns having a plurality of line segments positioned in a spatial sequence with consecutive ones of said pattern line segments having an intersection corresponding to the ends thereof, said process comprising:

placing a sheet of work material on a work supporting surface and drawing at least one visible pattern line on said sheet with a drawing implement, digitizing, substantially simultaneously with said pattern line drawing, the position of said implement relative to said work supporting surface as it moves along said pattern line to provide drawn line position signals representing said line, arranging said position signals into signals sets corresponding to randomly drawn, non-continuous or overlapping ones of said drawn lines, inputting said position signals to a computer, composing, for each of said pattern line segments, a preferred pattern line segment signal set from one or more substantially adjacent drawn line signal sets, generating a garment pattern signal set from said preferred drawn line position signal sets;

displaying said position signals on a graphic display screen, and thereafter using said position signals to control a plotter to plot a representation of said line on a plot medium.

20. A process for developing garment patterns as defined in claim 19 further characterized by said step of drawing at least one visible pattern line on said sheet of work material being accomplished by placing an existing garment pattern made of sheet material adjacent one side of said sheet of work material and with the use of said implement tracing at least one line of said existing pattern onto said sheet of work material.

21. A process for developing garment patterns as defined in claim 19 further characterized by said step of drawing at least one visible pattern line on said sheet of work material being accomplished by draping a piece of fabric over a model and generating a line on said piece of fabric while it is draped on said model, removing said piece of fabric from said model and placing it on said work supporting surface adjacent one side of said sheet of work material, and then tracing said generated line onto said sheet of work material by moving said drawing implement in tracing fashion along said generated line.

22. A process for developing garment patterns as defined in claim 19 further characterized by said step of drawing at least one visible pattern line on said sheet of work material being accomplished by drawing directly onto said sheet of work material with said drawing implement without tracing a line from another sheet of material placed adjacent one side of said sheet of work material.

23. A process for developing garment patterns as defined in claim 19 further characterized by said at least one visible pattern line which is drawn on said sheet of work material being part of a pattern, showing a representation of said complete pattern on said display screen, modifying the representation of the complete pattern shown on said display screen until an acceptable pattern shape is achieved, and then controlling a plotter to plot a repeat of said acceptable pattern shape onto a sheet of paper.

24. A process for developing garment patterns as defined in claim 23 further characterized by said step of modifying the pattern representation shown by said display screen being accomplished by inputting to a computer modification instructions selected from an instruction menu, and executing said instructions by said computer.

25. A process for developing garment patterns as defined in claim 23 further characterized by said step of modifying the pattern representation shown by said display screen being accomplished by drawing one or more lines on said sheet of work material supported by said work supporting surface, digitizing the position of said implement relative to said work supporting surface as it moves along said one or more lines to provide position signals representing said one or more lines, and supplying said position signals representing said one or more lines to a computer which uses them to modify the complete pattern representation shown by said display screen.

26. An article made in accordance with a method comprising the steps of:

drawing a visible line on a sheet of work material on a work supporting surface by means of a stylus;

selectively enabling the generation of position signals in an electrical circuit in proximity with a stylus tip;

producing, in an electrical circuit associated with a digitizing panel, position signals representing the position of said stylus tip relative to said supporting surface as said stylus is moved over said supporting surface in proximity thereto;

digitizing, substantially simultaneously with said line drawing, said position signals to provide drawn line position signals representing said line;

generating, by means of a controller adapted to receive said positions signals, a database of signals corresponding to at least one article segment pattern in accordance with the steps of:

composing segment pattern lines from sets of adjacent drawn line positions signals corresponding to randomly drawn, non-continuous or overlapping ones of said drawn lines, and further forming a segment pattern signal group corresponding to said garment pattern from selected ones of said segment pattern drawn line signal sets;

editing selected position signals in said pattern lines in response to instruction signals; and storing said signal database in a memory means;

visually displaying selected ones of said position signals as well as said instruction signals and signals indicative of the operational status of the system on a graphic display device connected with said controller; and inputting said instruction signals to said controller.

* * * * *